(12) United States Patent
Shin

(10) Patent No.: US 6,883,506 B2
(45) Date of Patent: Apr. 26, 2005

(54) APPARATUS FOR INDUCING AIR FOR AN ENGINE

(75) Inventor: Chang-Hyun Shin, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/607,491

(22) Filed: Jun. 25, 2003

(65) Prior Publication Data

US 2004/0000298 A1 Jan. 1, 2004

(30) Foreign Application Priority Data

Jun. 29, 2002 (KR) .................................. 10-2002-0037713

(51) Int. Cl.[7] ................................................ F02D 9/10
(52) U.S. Cl. ..................................................... 123/585
(58) Field of Search .......................... 123/585, 339.23, 123/184.57, 184.53, 337

(56) References Cited

U.S. PATENT DOCUMENTS 4,922,879 A * 5/1990 Kaji et al. .................. 123/494
5,564,387 A * 10/1996 Igarashi et al. ........ 123/339.23
6,360,708 B2 * 3/2002 Hwang et al. ......... 123/184.57
6,634,334 B1 * 10/2003 Hwang et al. ......... 123/339.23

FOREIGN PATENT DOCUMENTS

JP  11082095 A  *  3/1999  ........... F02D/33/00

* cited by examiner

Primary Examiner—Tony M. Argenbright
Assistant Examiner—Hyder Ali
(74) Attorney, Agent, or Firm—Morgan Lewis & Bockius LLP

(57) ABSTRACT

An apparatus for inducting air for an engine is disclosed wherein noise that occurs when intake air flowing through a bypass passage is confluent with intake air drawn from a main passage while the idle speed control actuator is operated is reduced. The apparatus also includes a chamber for temporarily preserving the intake air such that the revolution speed and output power of the engine can be stabilized. In one embodiment a throttle body has a main passage formed therethrough. A throttle valve is mounted in the main passage and a bypass passage bypasses the throttle valve. A surge tank is connected with the throttle body to receive intake air from the throttle body, and the bypass passage extends to the surge tank. The surge tank is provided with a chamber connected to the bypass passage.

14 Claims, 2 Drawing Sheets

APPARATUS FOR INDUCING AIR FOR AN ENGINE

FIELD OF THE INVENTION

This invention relates to an apparatus for inducting air for an engine, and more particularly, to such an apparatus that reduces noise resulting from by-passing of intake air and stabilizes revolution speed and output power of the engine.

BACKGROUND OF THE INVENTION

Generally, a throttle body of an intake system of an engine is provided with an ISCA (Idle Speed Control Actuator) such that the engine can also be supplied with intake air while driven in an idling state, that is a state where a throttle valve is closed.

Conventional throttle bodies are connected to an upstream side of a surge tank through a main passage. A throttle valve is rotatably mounted in the main passage such that supply of the intake air can be controlled thereby. The ISCA typically is connected by a bypass passage to the throttle body. The inlet of the bypass passage is generally located in front of the throttle valve, and the outlet of the bypass passage is located in rear of the throttle valve such that air can bypass the throttle valve and be drawn to the engine in an idle state. A solenoid valve may be provided to control the intake air through the bypass passage.

Generally, the output end of the bypass passage is perpendicularly connected to the main passage. Accordingly, when the throttle valve is opened for engine acceleration and the solenoid valve is open for the control of bypass air, the bypass air through the bypass passage is drawn and accelerated by the intake flow moving rapidly through the main passage to create a Venturi tube effect. Such an aerodynamic effect in an intake system of an engine can cause a noise like a piping sound, and such a noise deteriorates the quality of a vehicle.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention comprises a throttle body having a main passage formed therethrough, a throttle valve mounted in the main passage, and a bypass passage bypassing the throttle valve. A surge tank is connected with the throttle body to receive intake air from the throttle body, wherein the bypass passage extends to the surge tank, and the surge tank is provided with a chamber connected to the bypass passage.

In a further embodiment, an outlet passage is formed from the chamber to the main passage and the outlet passage is inclined toward main passage at a predetermined angle.

In another further embodiment, the chamber, having dimensions capable of temporarily storing intake air from the bypass passage, is formed on the periphery of the main passage with predetermined range. In another further embodiment, the bypass passage extends in the direction of the surge tank in parallel with the main passage.

In an alternative embodiment of the invention, a throttle body defines a main passage and a bypass passage having an inlet in the main passage. A throttle valve is disposed in the main passage downstream of the bypass inlet. A surge tank is positioned downstream of the throttle valve and defines a continuation of the main passage to receive airflow therethrough. The surge tank further defines a bypass passage communicating with the throttle body bypass passage and an outlet from the bypass passage into the surge tank main passage. Preferably, the bypass passage outlet in the surge tank is oriented at an angle with respect to airflow in the main passage to reduce noise resulting from simultaneous flow through both passages. Also, the bypass passage in the surge tank preferably defines an enlarged chamber to store bypass air for supply to the main passage upon opening of the bypass passage.

In another alternative embodiment, a throttle body again defines a main passage and a bypass passage having an inlet in the main passage. A throttle valve is disposed in the main passage downstream of the bypass inlet. A valve is disposed in the bypass passage for opening and closing the bypass passage in response to appropriate idle control signals. A surge tank is positioned downstream from the throttle valve and defines (i) a continuation of the main body passage to receive airflow therethrough, (ii) a bypass passage communicating with the throttle body bypass passage, the surge tank bypass passage including an enlarged chamber, and (iii) an outlet from the bypass passage into the surge tank main passage, the outlet being oriented to direct bypass flow in a direction gradually confluent with main passage flow. Preferably, the enlarged chamber is of sufficient volume to store bypass air for supply to the main passage upon opening of the bypass valve, thereby stabilizing operation of an engine receiving intake air therefrom.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will hereinafter be described in detail with reference to the accompanying drawings.

Figure 1:
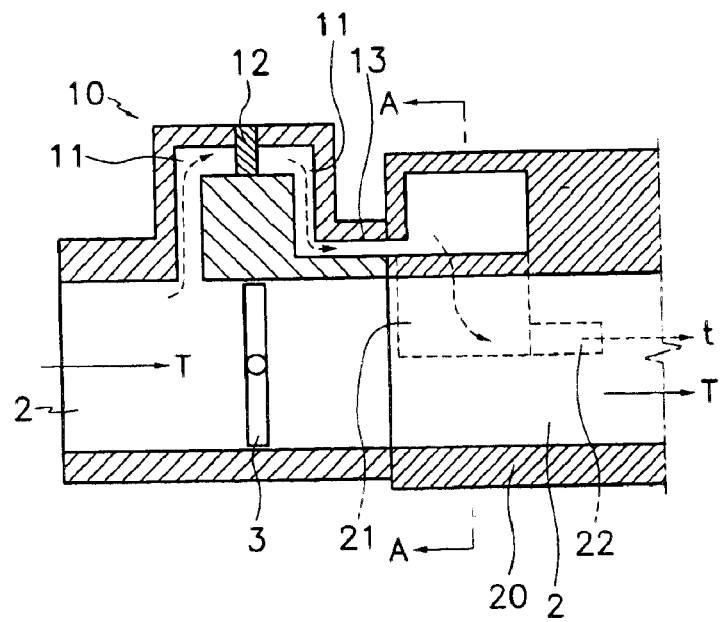
FIG. 1 is a schematic diagram showing an apparatus for inducting air for an engine according to a preferred embodiment of the present invention.

FIG. 1 is a schematic diagram showing an apparatus for inducting air for an engine according to a preferred embodiment of the present invention. As shown in FIG. 1, a throttle body 1 has a main passage 2 formed therethrough. A throttle valve 3 is rotatably mounted in the main passage 2 such that supply of an intake air can be controlled thereby. The throttle body 1 and a surge tank 20 can communicate with each other by the main passage 2.

An ISCA 10 has a bypass passage 11 therethrough. The ISCA 10 is connected to the surge tank 20 by the bypass passage 11 which is provided with a solenoid valve 12 to control supply of the intake air. An extension 13 is formed in the end of the bypass passage 11 to the direction of the surge tank 20 in parallel with the main passage 2.

The surge tank 20 has a chamber 21 therein. Chamber 21 is preferably sized to temporarily store intake air. The size of the chamber may fall within a range that can be determined experimentally by a person skilled in the art based on the amount of air required in the idle state, which varies with the piston displacement of particular engines. The chamber 21 is connected to the extended passage 13 so as to guides the intake air flowing from the bypass passage 11 to the chamber 21 of the surge tank. The intake air from the extended passage 13 is stored in the chamber temporarily.

Figure 2:
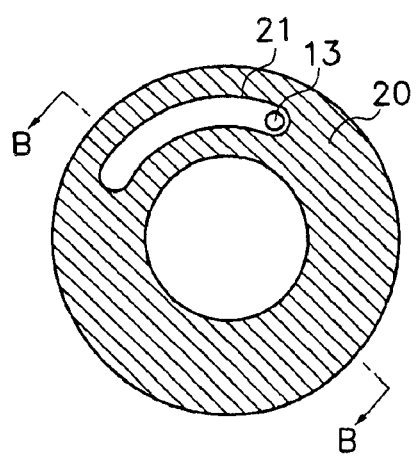
FIG. 2 is sectional view taken along a line A—A in FIG. 1.
Figure 3:
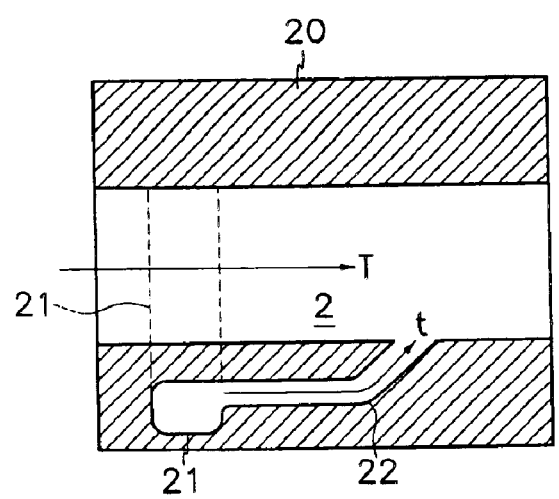
FIG. 3 is sectional view taken along a line B—B in FIG. 2.

As shown in FIG. 2, chamber 21 is formed on the periphery of the main passage 2 of the surge tank 20 to receive the intake air through the bypass passage 11 and the extended passage 13. As shown in FIG. 3, the outlet passage 22 is formed from the chamber 21 to the main passage 2. The intake air from the chamber 21 is confluent with the main passage 2 at the side of the surge tank 2. The outlet passage 22 is extended in parallel with the main passage 2 within the predetermined section and is to be gradually confluent at which the main passage 2 is located.

If the outlet passage 22 is formed in this manner, although the intake air (T) through the main passage 2 flows rapidly, the operational noise of the ISCA, such as a piping sound, does not occur when the intake air (t) passes through the bypass passage 11. Preferably the outlet passage is inclined toward the main passage at an angle between about 20 to 40 degrees and more preferably at about 30 degrees.

Furthermore, the chamber 21 for temporarily storing of the intake air is formed in front of the outlet passage 21. Accordingly, when the solenoid valve 12 is opened, the intake air stored in the chamber 21 is supplied to the engine in advance such that the revolution speed and output power of the engine can be more stable.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. An apparatus for inducting air for an engine, comprising:
   a throttle body having a main passage formed therethrough, a throttle valve mounted in the main passage, and a bypass passage bypassing the throttle valve; and
   a surge tank connected to the throttle body to receive intake air from the throttle body,
      wherein the bypass passage extends to the surge tank, and the surge tank defines a chamber connected to the bypass passage, the chamber having a larger cross-sectional area than the bypass passage.

2. The apparatus of claim 1, wherein an outlet passage is formed from the chamber to the main passage, the outlet passage being inclined toward main passage with predetermined angle.

3. The apparatus of claim 1, wherein the chamber, having dimensions capable of temporarily storing of the intake air from the bypass passage, is formed on the periphery of the main passage with predetermined range.

4. The apparatus of claim 2, wherein the chamber, having dimensions capable of temporary storing of the intake air from the bypass passage, is formed on the periphery of the main passage with predetermined range.

5. The apparatus of claim 1, wherein the bypass passage extends in the direction of the surge tank in parallel with the main passage.

6. The apparatus of claim 2, wherein the bypass passage extends in the direction of the surge tank in parallel with the main passage.

7. The apparatus of claim 3, wherein the bypass passage extends in the direction of the surge tank in parallel with to the main passage.

8. An apparatus comprising:
   a throttle body defining a main passage and a bypass passage having an inlet in the main passage;
   a throttle valve disposed in said main passage downstream of the bypass inlet;
   a surge tank positioned downstream of the throttle valve and defining a continuation of the main passage to receive airflow therethrough, said surge tank further defining a bypass passage communicating with said throttle body bypass passage, and an outlet from said bypass passage into the surge tank main passage, wherein said bypass passage forms an angle not less than about 20 degrees and not more than about 40 degrees with said main passage at the outlet.

9. The apparatus of claim 8, wherein said bypass passage outlet in said surge tank is oriented at an angle with respect to airflow in the main passage to reduce noise resulting from simultaneous flow through said passages.

10. The apparatus of claim 8, wherein said bypass passage in the surge tank defines an enlarged chamber to store bypass air for supply to the main passage upon opening of the bypass passage.

11. The apparatus of claim 10, wherein opening and closing of the bypass passage is controlled by a solenoid valve.

12. An apparatus, comprising:
   a throttle body defining a main passage and a bypass passage having an inlet in the main passage;
   a throttle valve disposed in said main passage for opening and closing same;
   a surge tank positioned downstream of the throttle valve and defining (i) a continuation of the main passage to receive airflow therethrough, (ii) a bypass passage communicating with said throttle body bypass passage, said surge tank bypass passage including an enlarged chamber, and (iii) an outlet from said bypass passage into the surge tank main passage, said outlet being oriented to direct bypass flow in a direction gradually confluent with main passage flow.

13. The apparatus of claim 12, wherein said enlarged chamber is of sufficient volume to store bypass air for supply to the main passage upon opening of the bypass valve, thereby stabilizing operation of an engine receiving intake air therefrom.

14. The apparatus of claim 12, wherein the bypass valve is a solenoid valve.

* * * * *